United States Patent [19]
Lhota

[11] Patent Number: 4,806,134
[45] Date of Patent: Feb. 21, 1989

[54] METHOD AND SYSTEM FOR CONTROLLING A COMPRESSED AIR FLOW IN AN AIR DRIER

[75] Inventor: Jiri E. J. Lhota, Salviagatan, Sweden
[73] Assignee: Garphyttan Haldex AB, Landskrona, Sweden
[21] Appl. No.: 136,693
[22] Filed: Dec. 22, 1987

[30] Foreign Application Priority Data

Dec. 22, 1986 [SE] Sweden .................................. 8605525

[51] Int. Cl.⁴ ............................................. B01D 53/04
[52] U.S. Cl. ........................................ 55/162; 55/163; 55/179; 55/387; 55/DIG. 17
[58] Field of Search ................... 55/18, 21, 31, 33, 62, 55/74, 161–163, 179, 387, DIG. 17

[56] References Cited

U.S. PATENT DOCUMENTS

| | | | |
|---|---|---|---|
| 3,464,186 | 9/1969 | Hankison et al. | 55/163 |
| 3,659,399 | 5/1972 | Kauer, Jr. et al. | 55/62 X |
| 3,902,875 | 9/1975 | Bridigum et al. | 55/179 X |
| 3,923,479 | 12/1975 | Glass et al. | 55/33 X |
| 4,007,021 | 2/1977 | Gyllinder | 55/62 X |
| 4,101,298 | 7/1978 | Myers et al. | 55/179 X |
| 4,306,889 | 12/1981 | Krüger et al. | 55/162 |
| 4,561,865 | 12/1985 | McCombs et al. | 55/162 X |
| 4,685,941 | 8/1987 | Sato | 55/21 X |
| 4,721,515 | 1/1988 | Hata et al. | 55/163 X |
| 4,732,587 | 3/1988 | Koch | 55/162 |

FOREIGN PATENT DOCUMENTS

| | | | |
|---|---|---|---|
| 888339 | 12/1971 | Canada | 55/33 |
| 2915336 | 10/1980 | Fed. Rep. of Germany . | |
| 2922616 | 12/1980 | Fed. Rep. of Germany . | |
| 3139683 | 4/1983 | Fed. Rep. of Germany | 55/163 |
| 3231519 | 3/1984 | Fed. Rep. of Germany | 55/162 |
| 3244414 | 6/1984 | Fed. Rep. of Germany . | |
| 3514473 | 10/1986 | Fed. Rep. of Germany . | |
| 132475 | 10/1979 | Japan | 55/161 |

*Primary Examiner*—Robert Spitzer
*Attorney, Agent, or Firm*—Laurence R. Brown; Alfred J. Mangels

[57] ABSTRACT

The compressed air flow in an air drier is directed to either one of its two drying towers by a switch-over valve whose switch-over function is performed with the air drier unloaded by an unloader valve arranged between the air drier and a compressor. The unloader valve is caused to perform its unloading function not only at a predetermined pressure in an air tank to which the air is fed but also—by an electronic control device—after a predetermined time during periods of prolonged continuous air loading from the compressor through the air drier even if the predetermined pressure is not reached.

6 Claims, 3 Drawing Sheets

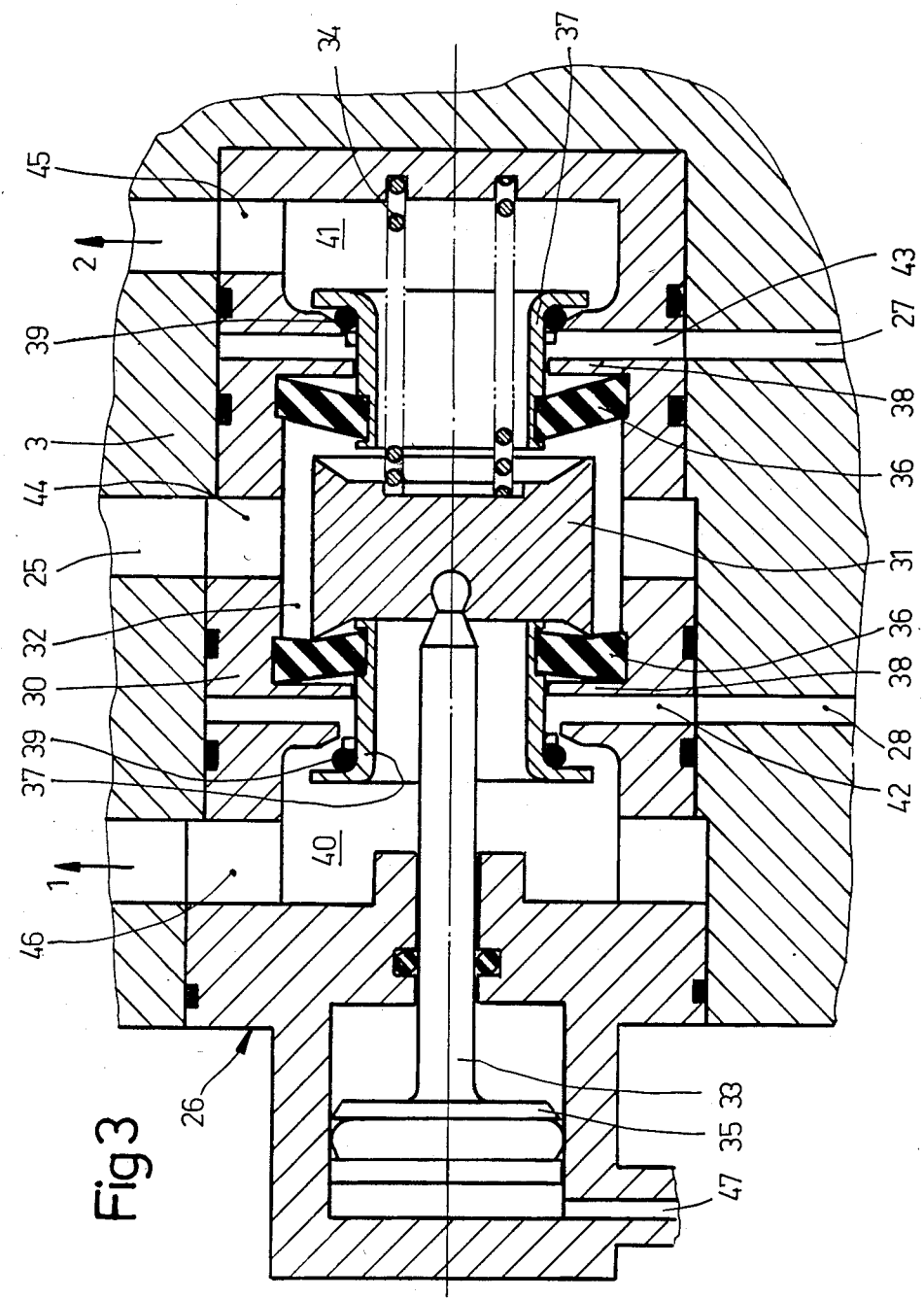

METHOD AND SYSTEM FOR CONTROLLING A COMPRESSED AIR FLOW IN AN AIR DRIER

TECHNICAL FIELD

This invention relates to a method of controlling a compressed air flow in an air drier to either one of two drying towers by means of a switch-over valve, whose switch-over function is performed with the air drier unloaded by means of an unloader valve arranged between the air drier and compressor. The invention also relates to a control system for carrying out this method.

BACKGROUND ART

In an air drier of the type with two drying towers containing desiccant one of the towers is used for drying air emanating from the compressor, while at the same time the desiccant in the other tower is regenerated by a small fraction of the dried air, which is passed back through the desiccant. The switch-over between the two towers is to be accomplished by a valve, which may also have the function to vent out the regenerating air from the tower that for the time being is not used for drying the air.

A switch-over valve may—as is well known in the art—be controlled either entirely by the air pressure in the system (in which case no separate and external control means are required) or by external control means, which may be electrical and/or pneumatic. The latter control type is to be used when it is desired to accomplish a switch-over at other instances than at a certain air pressure level in the system.

In order to safe-guard a proper function and to minimize the forces acting on the different components during the switch-over process, it is preferred to perform the switch-over when the air drier is unloaded by means of the unloader valve; the switch-over is in other words correlated with the unloading.

SUMMARY OF THE INVENTION

According to the invention the unloader valve—at an air drier of the type with external control means—is caused to perform its unloading function not only in a predetermined level of the pressure in an air tank to which the air is fed, but also—by an electronic control device—after a predetermined time during periods of prolonged continuous air loading from the compressor through the air drier, even if said pressure is not at the predetermined level.

The thought behind this new method is to see to it that each and the same drying tower is not used continuously for such long times without regeneration so that the desiccant is saturated with moisture or cannot perform its drying function properly.

A system for carrying out this method is according to the invention characterized in that the outlet from the air drier is connected to an electric pressure switch, to the unloader valve through a first, electrically controlled pilot valve, and to the switch-over valve through a second, electrically controlled pilot valve, the electric voltage for controlling the pilot valves being provided from an electronic control device and—in the case of the first pilot valve—also from the pressure switch, wherein the arrangement is such that voltage is supplied to the first pilot valve for directing operating air pressure to the unloader valve either through the pressure switch, which is closed when the pressure in said outlet is at a predetermined level,
or through the electronic control device if during periods of prolonged continous air loading from the compressor through the air drier the pressure switch has not been closed after a predetermined time, and that voltage is supplied to the second pilot valve for directing operating air pressure to the switch-over valve in the period from one to the next subsequent commencement of voltage supply to the first pilot valve, and is not supplied in the period from the next subsequent to the second subsequent commencement of voltage supply to the first pilot valve to allow the switch-over valve to return to its rest position.

By this arrangement the desired result is obtained, namely that the switch-over is performed (always with the air drier unloaded) not only at a predetermined pressure—which is the main controlling criterion—but also at certain times during periods of prolonged continuous air loading.

In a preferred embodiment the predetermined time after which time-controlled switch-over is initiated, or in other words voltage is supplied to the first pilot valve through the electronic device, if the pressure switch has not been closed, is in the order of 3 minutes, and the voltage supply lasts 5-6 seconds in order to give proper time not only for the unloading but also for the switch-over at unloaded condition.

It is preferred to allow a certain time to lapse after the unloader valve is opened until the switch-over is performed, so that unloaded condition for the air drier is guaranteed. This is according to the invention accomplished in that the electronic control device provides a time delay of 2-3 seconds for the voltage supply or not to the second pilot valve in response to the commencement of voltage supply to the first pilot valve.

BRIEF DESCRIPTION OF THE DRAWINGS

The invention will be described in further detail below reference being made to the accompanying drawings, in which FIG. 3 is a sectional view to a larger scale of a control valve for the air drier.

DETAILED DESCRIPTION OF THE PREFERRED EMBODIMENT

Figure 1:
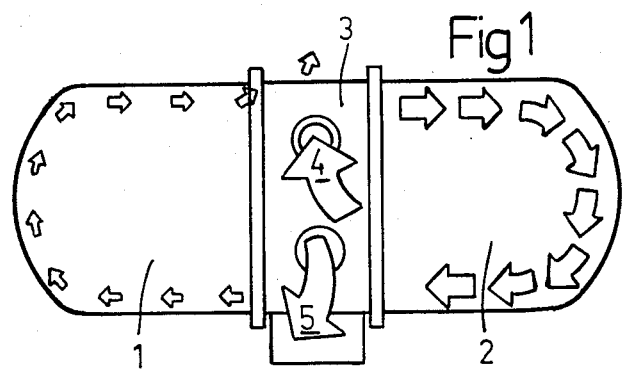
FIG. 1 is a schematic side-view of an air drier incorporating the invention.

A compressed air system, typically but not necessarily to be used on heavy road vehicles, can include an air drier of the type depicted in FIG. 1. Such an air drier—which in this case is of the so called two-tower type—is placed in the system between a compressor and an air tank, and its purpose is to remove humidity from the air delivered from the compressor so as to supply the different air consuming components on the vehicle with dry air.

Generally speaking and as shown in FIG. 1, an air drier according to the invention consists of a left drying tower 1, a right drying tower 2, and a centre part 3 containing valves and other means needed for the proper function of the air drier. Each drying tower 1 and 2 contains a filter and desiccant in a cartridge.

In use the compressed air flows from the compressor as indicated by the numeral 4 through one of the towers to be dried (in FIG. 1 the right tower 2 as illustrated by bigger arrows) and further to the air tank as indicated by the numeral 5. At the same time the other tower is regenerated, i.e. the desiccant therein is dried from the moisture adsorbed at its previous air drying cycle. The regeneration is performed in that a small amount of the dried air delivered from the air drier is passed through the tower to be regenerated and is then vented out to the atmosphere (as illustrated by smaller arrows in the left tower 1 in FIG. 1).

Figure 2:
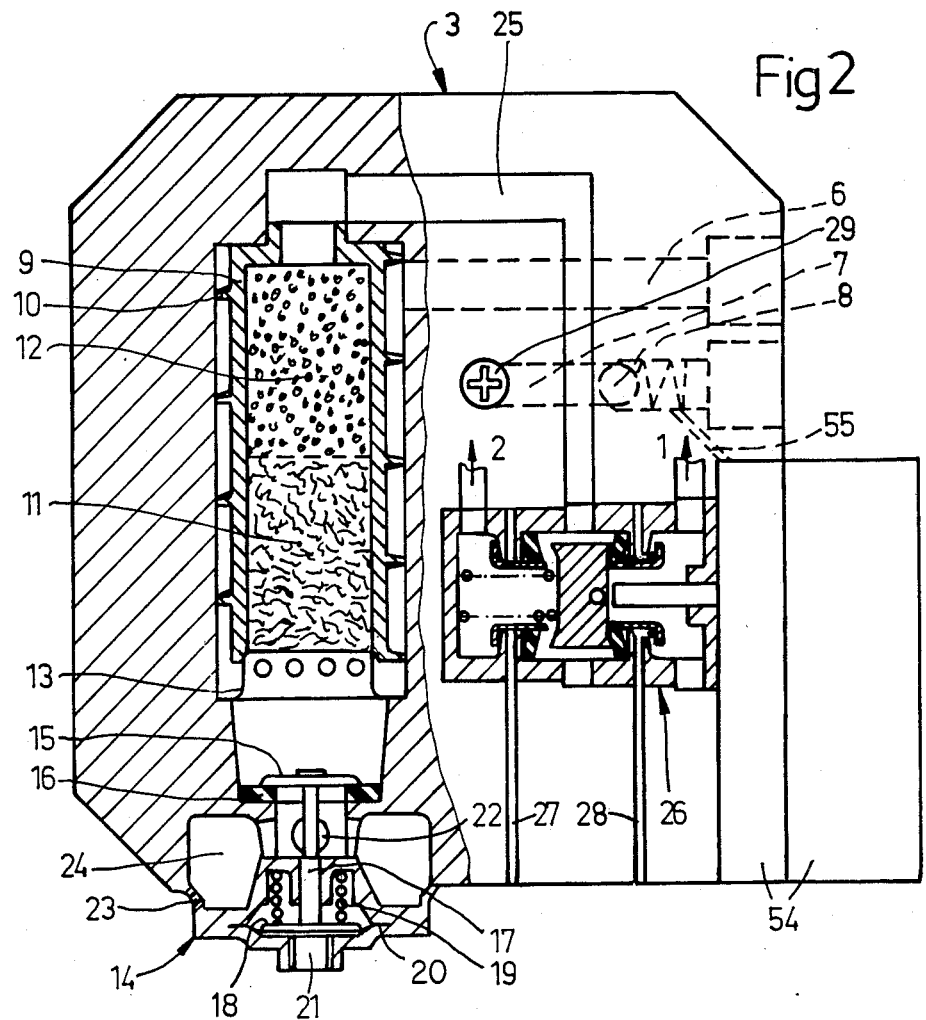
FIG. 2 is a partly sectional view through a centre part of the air drier.

FIG. 2 is a side-view, partly in section, of the centre part 3 containing the different valves, filters and control means to be described below.

An air inlet duct 6 is to be connected to the compressor for receiving the humid air. An air outlet duct 7 is to be connected to the air tank and contains an ordinary spring-biased check valve 8 with the function to prevent air from the air tank from returning to the air drier when the pressure therein is lower than that in the air tank.

The air inlet duct 6 leads to the upper part of a cylindrical compartment. Therein is arranged a cylindrical filter sleeve 9 having an external helical flange 10, which sealingly engages the compartment wall so as to form a helical path downwards outside the sleeve 9 for the air entering through the inlet duct 6.

The filter sleeve 9 is filled with metal wool 11 or similar material in its lower half and foam plastic 12 or similar material in its upper half. A cup 13 under the sleeve 9 is provided with holes so as to allow entrance of air from the helical path outside the sleeve to the interior thereof.

An unloader valve 14 provided below the sleeve 9 has a valve disc 15 sealingly engaging the sealing ring 16, a valve spindle 17 axially movable and attached to the valve disc 15, and a diaphragm disc 18 attached to the spindle 17. A helical compression spring 19 acts on the diaphragm disc 18 in the direction for holding the valve disc 15 in sealing contact with the sealing ring 16. A diaphragm 20 is clamped below the diaphragm disc 18 for sealing off a compartment at a connection 21. Openings 22 are provided under the valve disc 15, and ventilating holes 23 in the unloader valve 14 lead to the atmosphere. On its way out to the atmosphere through the unloader valve 14 the air has to pass sound absorbing material in chamber 24.

When the unloader valve 14 is closed (under the bias from the spring 19), which is the normal condition and means that air drying can take place, air flows at high speed in the helical path created by the helical flange 10. The helical path acts as a condensor and cyclone, so that water droplets and the like are separated from the air and gathered in the bottom region at the valve disc 15. This separation takes place without appreciably restricting the flow. After having passed into the filter sleeve 9 the air flows upwards through the material 11, where primarily oil contaminants and the like are separated or filtered off, and through the material 12, acting as a filter for other particles transported with the compressed air.

When the unloader valve 14 is opened due to a signal (to be described in conjunction with FIG. 4) in the form of an overpressure in the connection 21, the valve disc 15 is lifted from its sealing ring 16, so that the air from the compressor flows out into the atmosphere without appreciable restriction through the openings 22, the sound absorbing material in chamber 24, and the ventilating holes 23 and so that the overpressure in the whole air drier is lowered to atmospheric pressure. Hereby the water and the like gathered at the valve disc 15 is drained out, and the flow of air from the air drier to the atmosphere passes through the materials 11 and 12 conveying away oil, particles and the like gathered therein. The flow velocity can hereby be controlled by the choice of suitable material, especially the foam plastic 12, so that the desiccant in the respective drying tower 1 or 2 is not damaged.

From the separator and filter unit 9–13 as described above the compressed air flows through a conduit 25 to a 2-way control valve 26. This valve will be described in further detail below under reference to FIG. 3, but it has the function on one hand to direct the air flow to either one of the two drying towers 1 or 2, on the other hand to direct regenerating air from either one of the drying towers 2 or 1 to the atmosphere through drainage conduits 27 and 28. With the control valve 26 in the position shown in FIG. 2 the air flow from the compressor will be directed to the right drying tower 2, whereas the regenerating air from the left drying tower 1 is vented out to the atmosphere through the drainage conduit 28. As will appear more clearly from the description below, the control valve 26 is positively controlled.

Also visible in FIG. 2 at the outlet duct 7 is a double-acting check-valve 29, which has the main function to allow the air flow out from the drying air tower (under pressure), while at the same time closing off the other air tower. However, by being provided with a through bore in its valve body, the valve will lead a fraction of the dry air back into the other drying tower for regenerating the desiccant therein.

The control valve 26 is shown to a larger scale in FIG. 3, to which reference now is made.

A multi-chambered valve housing 30 is sealingly mounted in the centre part 3. A cylindrical valve body 31 is axially movably arranged in a central chamber 32 therein under the bias and guidance of a piston rod 33 and a helical compression spring 34. The piston rod 33 is integrated with a piston 35, is axially guided by the valve housing 30 and is attached to the valve body 31 by means of a ball joint so as to give the body a certain orientation adaptability.

At either side of the valve body 31 an annular valve seat 36 is mounted in a groove in the housing 30 in the central chamber 32. This valve seat 36 is made of rubber or similar elastic material and has a frusto-conical shape in a side-view.

At its inner periphery the valve seat 36 is mounted in an external groove in a valve sleeve 37, which is axially movable and guided by a dividing wall 38 of the valve housing 30. The valve seat 36 biases the valve sleeve 37 towards a position where a radial flange thereon abuts the wall 38. An O-ring 39 provides a seal between the flange and the wall, as can be seen to the right in FIG. 3. If the flange of the valve sleeve 37 is lifted from contact with the wall 38, as can be seen to the left in FIG. 3, there will be a passage from a left outer chamber 40 (or right outer chamber 41, respectively) to a left channel 42 in the wall 38 (or a right channel 43, respectively). These two channels 42 and 43, respectively, are connected to the two drainage channels 28 and 27, respectively, which were mentioned above in connection with FIG. 2 and lead to the atmosphere.

In the rest position of the valve 26 as shown in FIG. 3 the valve body 31 is held with an annular edge in sealing contact with the left valve seat 36 under the bias of the spring 34, whereas there is no contact between the valve body 31 and the right valve seat 36. Accordingly, air stemming from the compressor can flow through the conduit 25 in the centre part 3, through a conduit 44 in the valve housing 30 to the central chamber 32, further to the right chamber 41 through the open central part of the sleeve 37 and out to the right drying tower 2 through a conduit 45.

At the same time regenerating air from the left drying tower 1 enters the left chamber 40 through a conduit 46, passes the flange of the left valve sleeve 37, which is lifted from the wall 38 by the valve body 31 under the force from the spring 34, and leaves to the atmosphere through the channels 42 and 28.

If the piston 35 moves to the right in FIG. 3 with a force overcoming that of the spring 34 under fluid pressure admitted through a conduit 47, the completely opposite situation results: the main air flow goes from the conduit 25 to the left drying tower 1 past the left valve seat 36, whereas the regenerating air from the right drying tower 2 goes to the atmosphere through the channels 43 and 27 past the right valve sleeve 37, which now is lifted from the right wall 38 by the valve body 31 in its right end position.

The "floating" arrangement with the cooperation between the valve body 31, the valve seats 36, the walls 38 and the valve sleeves 37 has the distinct advantages of a comparatively simple design for a 2-way valve and a low production cost due to the complete lack of critical tolerances, while still the accuracy and reliability of the function are guaranteed.

Figures 4, 5:
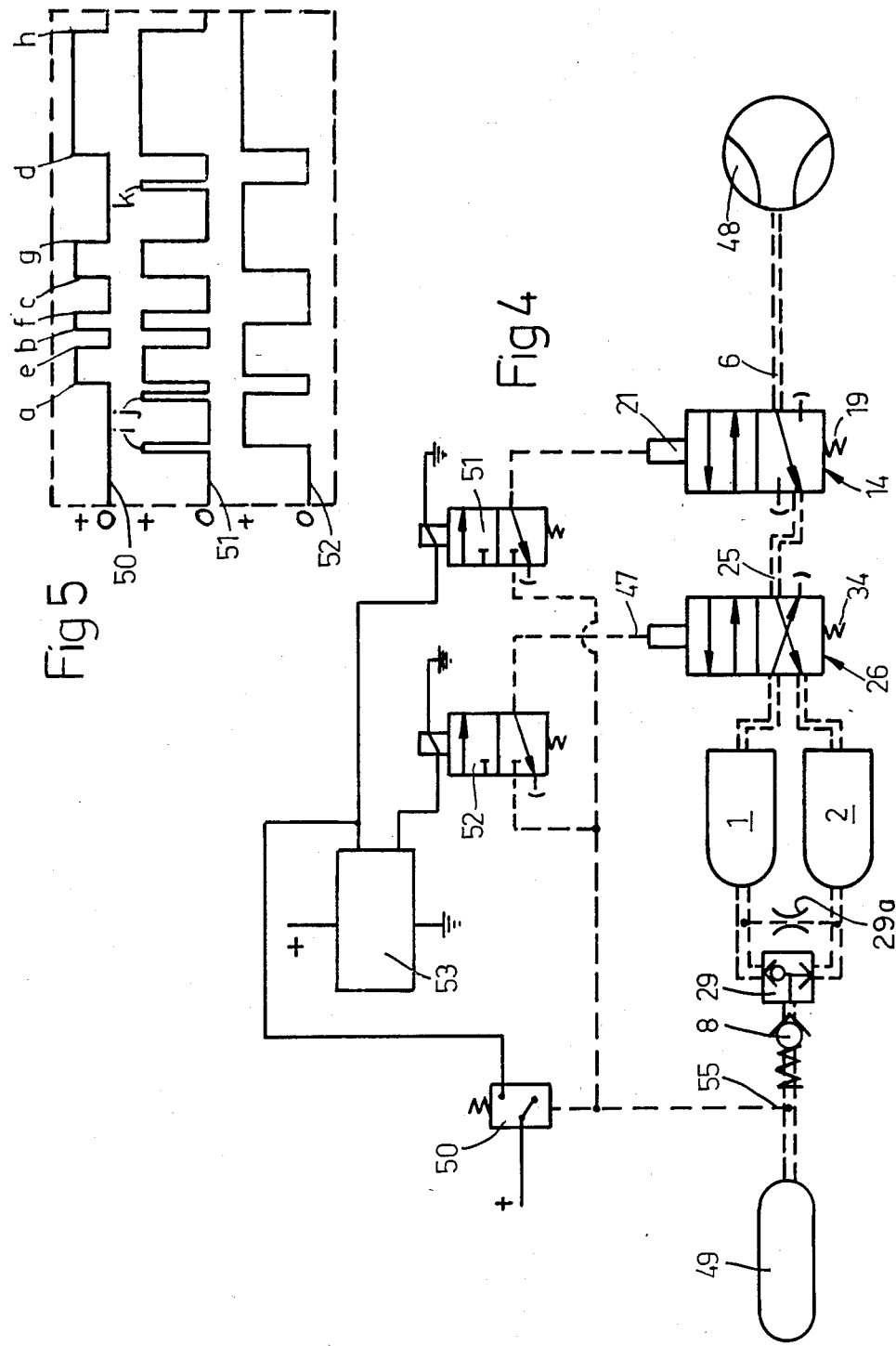
FIG. 4 is a diagram of an air drier system according to the invention.
FIG. 5 illustrates a sequence control of the air drier.

Reference is now made to FIG. 4. In the lower part thereof the system described above under reference to FIGS. 1-3 can be recognized. From the compressor—here provided with the numeral 48—the air passes the unloader valve 14 and the control valve 26 to either of the drying towers 1 and 2—in the case shown the tower 2. On its way from the drying tower the air passes the double check-valve 29, where a fraction of the dry air is passed back through the restriction 29a to the tower 1 as regenerating air. After having passed out of the air drier the air is collected in the air tank—here provided with the numeral 49.

As earlier described, the unloader valve 14 is held in its "normal" position allowing passage of air from the compressor 48 to the conduit 25 in the air drier under the bias of the spring 19, whereas its switch-over to the second position, in which both the air from the compressor and the conduit 25 is vented to the atmosphere, is effected at a pneumatic signal in the form of an overpressure at the connection 21.

Likewise, the control valve 26 is held in its "normal" position by the spring 34, whereas a switch-over is effected at a pneumatic signal in the form of an overpressure through the conduit 47.

The upper part of FIG. 4 depicts an electropneumatic system for controlling the unloader valve 14 and the control valve 26 and thus the function of the whole air drier.

In this upper part of FIG. 4 broken lines are used for pneumatic connections and full lines for electrical connections.

The components of the control system are a pressure switch 50, a first pilot valve 51, a second pilot valve 52, and an electronic control device 53. These components together with the pneumatic and electrical connections are placed in the centre part 3 of the air drier so as to create a self-sustained unit, which besides the air lines from the compressor and to the air tank only requires a voltage supply for its function. The complete control system is housed in the portions 54 of the centre part 3, as shown in FIG. 2.

The pressure in the air tank 49 equals the pressure in the outlet from the air drier, i.e., after the check-valve 8. It is supplied through a bore 55 (Fig 2) to the pressure switch 50 and the two pilot valves 51 and 52.

The pressure switch 50 is of the spring-biased type keeping the electrical connection broken until at rising pressure a certain pressure—for example 8.2 bar—has been reached and connection is established; at lowering pressure the connection will again be broken at a certain lower pressure—for example 7.0 bar.

The two pilot valves 51 and 52 are normally closed under spring bias but can be opened by an electrical signal provided from the electronic control device 53. In the practical case the voltage supplied is 24V DC to the pressure switch 50 as well as to the control device 53.

FIG. 5 is a sequence diagram illustrating the two positions of the two pilot valves 51 and 52, respectively, as controlled by the pressure switch 50 and the electronic control device 53. The diagram is just to be seen as an example of what can happen, and its purpose is to illustrate the principles of the control.

It may first be noted that at each time the pressure switch 50 is closed (indicating a filled air tank 49)—points a-d—the pilot valve 51 is activated for the same period of time as the pressure switch remains closed. The result hereof is that the unloader valve 14 is activated or "opened" under the air pressure from the bore 55 through the pilot valve 51 to the connection 21. The air from the compressor 48 as well as the air from the air drier is hereby vented to the atmosphere. This situation prevails until the pressure in the air tank 49 lowers and the pressure switch 50 opens again—points e-h.

If the time period during which the pressure switch 50 remains open exceeds for example three minutes (indicating a continuous air loading to the system from the compressor 48), the control device 53 will supply a rather short electrical signal to the pilot valve 51, as indicated by the "spikes" i-k in FIG. 5. The result is again that the unloader valve 14 is "opened" during the time said electrical signal lasts—say 5-6 seconds.

As earlier described, the switch-over valve 26 governs which drying tower 1 or 2 that will be used for drying air (while the other one is regenerated), and the second pilot valve 52 controls the position of the switch-over valve 26. The electrical control of the pilot valve 52 by the electronic control device 53 is such that each positive signal to the first pilot valve 51 (or rising flank on the line 51 in FIG. 5) will result in a change of condition for the second pilot valve 52 (activation or deactivation) or in other words a switch-over between the two drying towers 1 and 2 caused by the switch-over valve 26. In order to see to it that the switch-over occurs with de-pressurized air the changing signal to the second pilot valve 52 is somewhat delayed (for example in the region of 2-3 seconds) in relation to each rising flank on the line 51 in FIG. 5. The reason for accomplishing the switch-over with de-pressurized air is that the stresses and wear on the different components thereby is minimized.

The provision of the spikes i-k (even if the pressure switch 50 is not closed) has the purpose of accomplishing a switch-over between the two drying towers 1 and 2 during long periods of continous air loading to the system.

Modifications are possible within the scope of the appended claims, which are not limited to the use of the invention in air driers to be used on vehicles.

I claim:

1. Apparatus for controlling a compressed air flow from an air compressor to either one of two drying towers of an air drier, said apparatus including: an air-operated switch-over valve between the air drier and the compressor, an air-operated unloader valve being arranged between the switch-over valve and the compressor, an electric pressure switch downstream of the air drier for sensing air drier outlet pressure, the air for operating the unloader valve passing through a first, electrically controlled pilot valve and the air for operating the switch-over valve passing through a second, electrically controlled pilot valve, control means for controlling the positions of the first and second pilot valves, the control means including an electronic control device and the pressure switch, the electronic control device being responsive to the time the pressure switch is open, wherein the arrangement is such that voltage is supplied to the first pilot valve for directing operating air pressure to the unloader valve through one of the pressure switch, which is closed when the pressure at the drier outlet is at a predetermined level, and the electronic control device during periods of prolonged continuous air loading from the compressor through the air drier in the absence of operation of the pressure switch after a predetermined time, and that voltage is supplied to the second pilot valve for directing operating air pressure to the switch-over valve in a period from one to a next subsequent commencement of voltage supply to the first pilot valve and voltage is not supplied in the period from said next subsequent to the second subsequent commencement of voltage supply to the first pilot valve for allowing the switch-over valve to return to rest position.

2. Apparatus according to claim 1, wherein the predetermined time after which voltage is supplied to the first pilot valve through the electronic control device when the pressure switch has not been closed is in the order of 3 minutes and that such voltage supply lasts 5–6 seconds.

3. Apparatus according to claim 2, wherein the electronic control device provides a time delay of 2–3 seconds for the voltage supply to the second pilot valve in response to the commencement of voltage supply to the first pilot.

4. Apparatus for controlling the flow of compressed air from an air compressor to an air tank through an air drier having two independent drying sections, said apparatus comprising:

(a) a compressed air source;

(b) air storage tank means;

(c) air drier means positioned between the compressed air source and the air tank means, the air drier means including two independent drying towers connected in parallel with each other;

(d) unloader valve means positioned between the compressed air source and the air drier means for selectively permitting compressed air to pass to the air drier means;

(e) switch-over valve means positioned between the unloader valve means and the air drier means for selectively conducting compressed air to one of the drying towers;

(f) pressure sensing means downstream of the air drier means for providing a pressure signal when the pressure in the air tank means exceeds a predetermined pressure level;

(g) first (acuation) actuation means connected with the unloader valve means for actuating the unloader valve means in response to the pressure signal provided by the pressure sensing means when the pressure in the air tank means exceeds a predetermined value, and for actuating the unloader valve means after a predetermined time period has elapsed without a pressure signal from the pressure sensing means; and (h) second actuation means connected with the switch-over valve means for actuating the switch-over valve means to permit air from the compressed air source to flow into one of the drying towers, the second actuation means responsive to actuation of the unloader valve means and operable to maintain the switch-over valve means in an actuaded condition until a succeeding actuation of the unloader valve means.

5. Apparatus according to claim 4, including delay means for delaying actuation of the switch-over valve means for a predetermined time period after actuation of the unloader valve means.

6. Apparatus according to claim 4, including regeneration conduit means interconnecting outlets of the drying towers, and flow restriction means to limit air flow in the regeneration conduit means.

* * * * *